E. I. DODDS.
RAILWAY CAR TRUCK.
APPLICATION FILED MAR. 25, 1908.
966,432.
Patented Aug. 9, 1910.
3 SHEETS—SHEET 1.
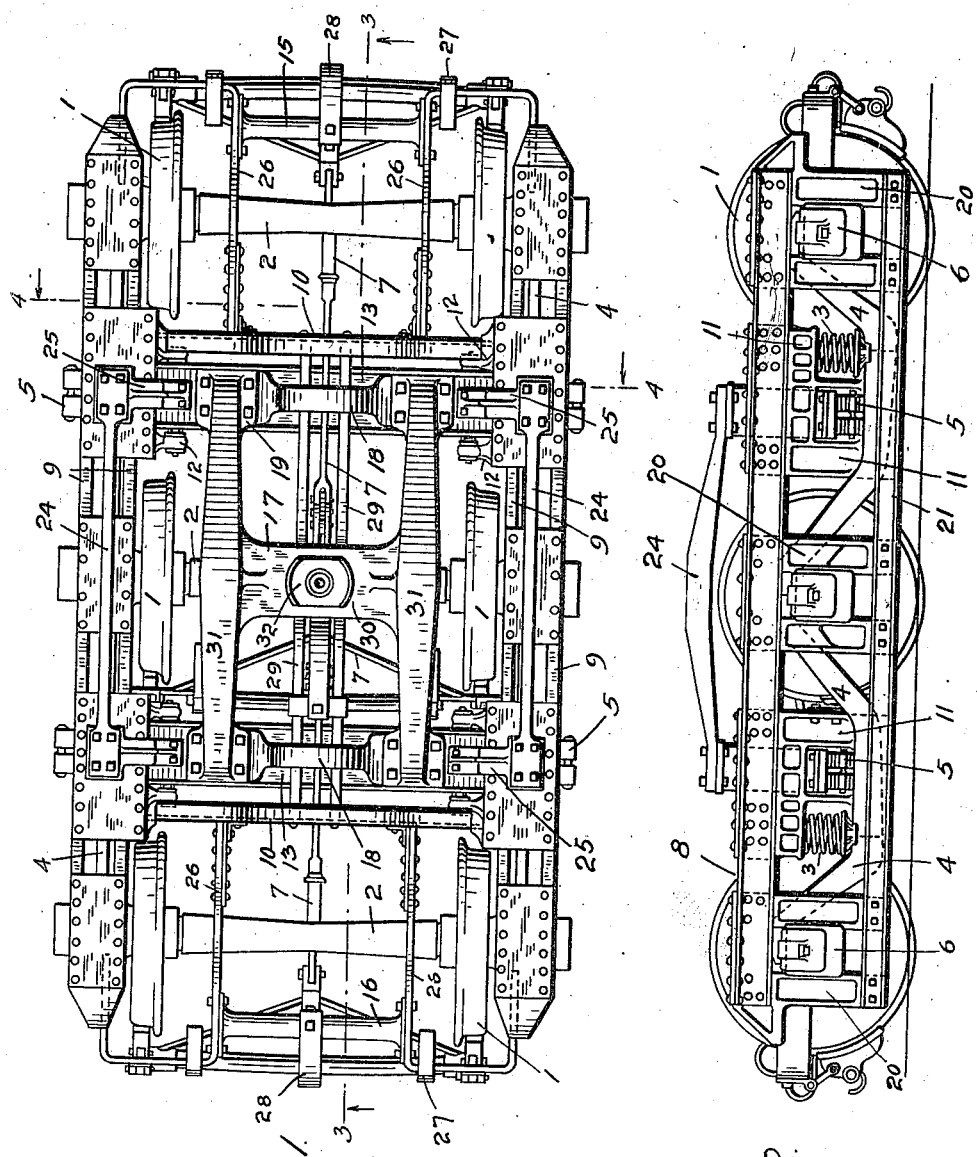
WITNESSES:
F. B. Townsend
H. W. Munday
INVENTOR
Ethan I. Dodds
BY
Munday, Evarts, Adcock & Clarke,
*his* ATTORNEYS E. I. DODDS.
RAILWAY CAR TRUCK.
APPLICATION FILED MAR. 25, 1908.
966,432.
Patented Aug. 9, 1910.
3 SHEETS—SHEET 2.
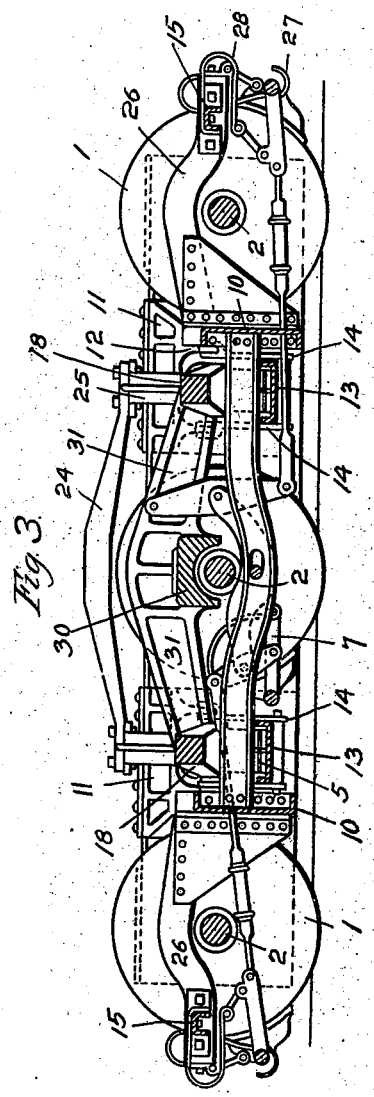
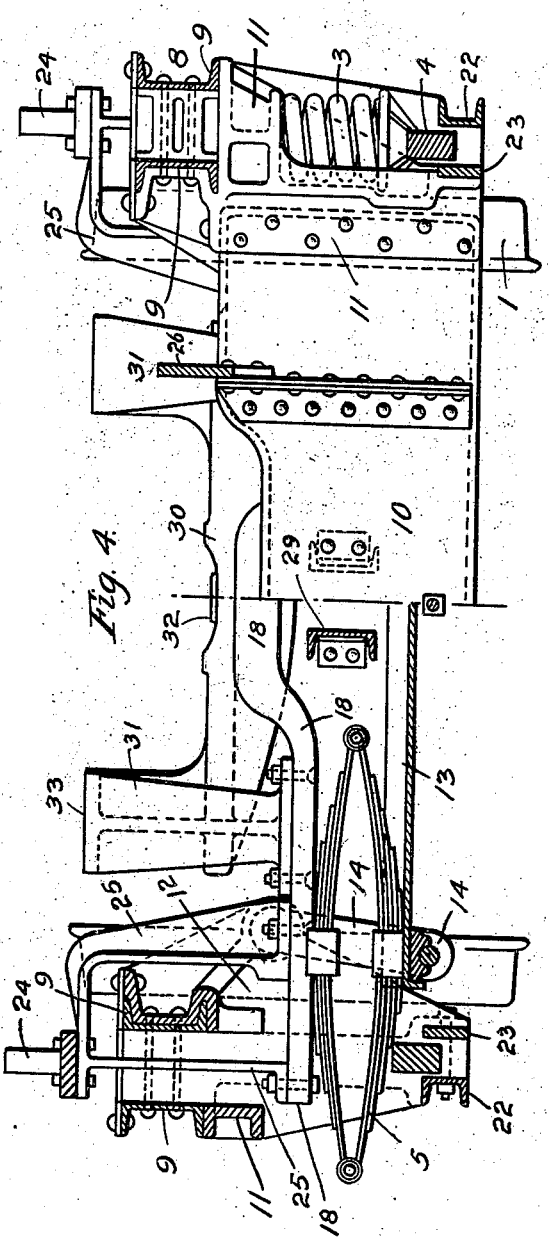
WITNESSES:
F. B. Townsend
H. W. Munday
INVENTOR
Ethan I. Dodds
BY
Munday, Evarts, Adcock & Clarke
his ATTORNEYS E. I. DODDS.
RAILWAY CAR TRUCK.
APPLICATION FILED MAR. 25, 1908.
966,432.
Patented Aug. 9, 1910.
3 SHEETS—SHEET 3.
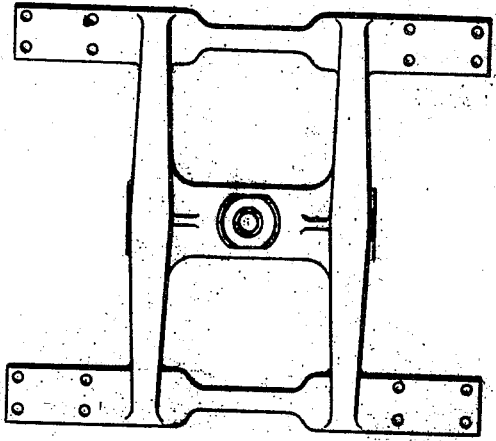
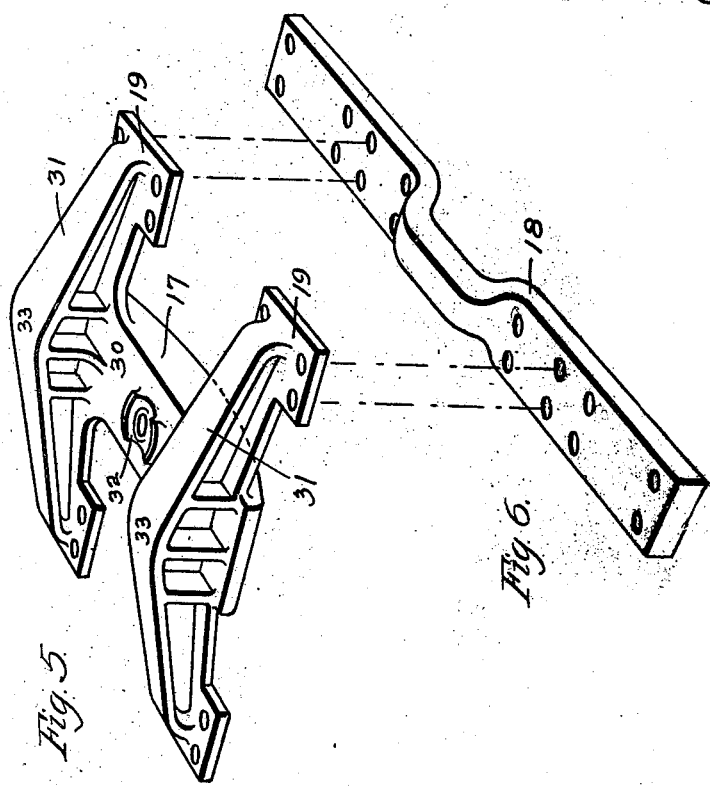
WITNESSES:
F. B. Townsend
H. W. Munday
INVENTOR
Ethan I. Dodds
BY
Munday, Evarts, Adcock & Clarke
HIS ATTORNEYS

UNITED STATES PATENT OFFICE.

ETHAN I. DODDS, OF CENTRAL VALLEY, NEW YORK.

RAILWAY-CAR TRUCK.

966,432.  Specification of Letters Patent.  Patented Aug. 9, 1910.

Application filed March 25, 1908. Serial No. 423,152.

*To all whom it may concern:*

Be it known that I, ETHAN I. DODDS, a citizen of the United States, residing in Central Valley, in the county of Orange and State of New York, have invented a new and useful Improvement in Railway - Car Trucks, of which the following is a specification.

My invention relates to improvements in trucks for railway cars, and more particularly to improvements in metal car trucks of the six wheeled type.

The object of my invention is to provide an all steel six wheeled passenger car truck, which will have a certain and proper amount of elasticity, and in which also the truck center plate will be materially lower than in the constructions heretofore in use, thus enabling the car body itself to have strong and deep center sills without increasing the height of the car body.

My invention consists in the means employed to practically accomplish this object or result as herein shown and described and more particularly specified in the claims.

In the accompanying drawing forming a part of this specification, Figure 1 is a plan view of a six wheeled passenger car truck embodying my invention. Fig. 2 is a side elevation. Fig. 3 is a longitudinal section on line 3—3 of Fig. 1. Fig. 4 is a cross section on the broken line 4—4 of Fig. 1. Fig. 5 is a detail perspective view of the truck bolster and center plate. Fig. 6 is a detail perspective view of one of the forged steel members of the truck bolster and Fig. 7 represents a modification in which the bolster members shown in Figs. 5 and 6 are cast in one integral piece.

In the drawing, 1 represents the wheels of a six wheeled truck, 2 the axles, 3 the springs, 4 the equalizer bars, 5 the elliptic springs, 6 the journal boxes and 7 the brake apparatus, all of which may be of any ordinary or customary construction.

The upper or compression members 8 of the side frame of the truck consist of a pair of rolled steel channels 9 placed with their webs back to back. The two compression members 8 are tied together by means of transoms 10 which are secured to the channels 9 by means of connecting castings 11 of cast steel, which are provided with lugs 12 for the suspension of the spring plank 13 through the medium of forged hangers 14. The side frame compression members 8 composed of the channels 9 are further tied together by compressed or rolled steel transoms 15, 16, through the connecting safety guards 27. The truck bolster 17, 18 is preferably composed of a cast steel member 17 and a pair of forged steel bars 18 securely riveted to the feet 19 of the cast steel member 17.

The pedestals 20 are of cast steel and extend between the upper or compression members 8 and the lower or tension members 21 of the truck side frame. The tension members 21 preferably consist of a rolled channel 22 and a rolled rectangular iron member 23 which are connected together by the steel connecting castings 1.

The side bearings bars 24 are preferably supported by extending the bolster members 18 out over the elliptic springs 6 and connecting the same thereto by connecting castings 25. The safety guards 26 are preferably steel forgings and form a support for the brake release springs 27 and the brake hanger spring 28. The transoms 10, 10 are tied together longitudinally of the truck by means of two channels 29 that are secured to said transoms.

The cast steel bolster member 17 is preferably a substantially H shaped casting having a transversely extending depressed center plate member 30 connecting its longitudinally extending arched or truss shaped limbs 31; the feet 19 of which rest upon the transversely extending forged steel bolster members 18. The longitudinal members 31 of the bolster casting 17 are sufficiently spaced apart by the depressed center plate member 30 to give room for the center sills of the car body between them so that the truck center plate 32 of the upper face of the depressed center plate member 30 is thus brought very materially lower than the upper portion 33 of the truck bolster itself. This construction of truck bolster with the center plate and center plate member 30 extending between and projecting below the lower face of the longitudinal members 31 which are spaced apart sufficiently to accommodate the center sills of the car body, and which at their trussed or arched portions project above the center plate member, thus serves to bring the truck center plate itself comparatively low, so that wide and deep center sills may be employed on the car body without raising its height.

I prefer to make the transverse bolster members 18, 18, of forged steel and in separate pieces from the cast steel member 17 of the bolster, as illustrated in Figs. 1 to 6 of the drawing, but if desired, the bolster members 18 may be cast integral with the bolster member 17, as illustrated in Fig. 7 of the drawing.

By combining together in the truck frame rolled or pressed steel compression members 8, pressed or rolled steel tension member 21 tied together by pressed or rolled steel transoms 10, 15 and 16 in connection with the cast steel pedestals 20 and cast steel connecting castings 11 and cast steel bolster 17, I produce an all steel six wheeled car truck of great strength, and which at the same time possesses the requisite amount of elasticity to render it easy in operation and cause it to be safe and reliable and extremely durable. The upward concaving of the transverse bolster members 18 affords room for the brake rod 7.

I claim:—

1. In a six wheeled steel passenger car truck, the combination with rolled or pressed steel side frame compression members, tension members and transoms, of steel connecting castings extending between and secured to said compression and tension members and to said transoms, and a cast steel bolster having a depressed transversely extending center plate member and arched longitudinal members above said center plate member integral therewith and spaced apart to admit the center sills of the car body between them, and upwardly concaved forged steel transverse bolster members upon which said bolster casting rests, said transverse bolster member being upwardly concaved to accommodate the brake rod, substantially as specified.

2. The combination in a steel truck of side frames and connecting castings, a spring plank, hangers connecting the spring plank with said connecting castings, springs resting on said spring plank, and a cast steel bolster resting on said springs and having an integral depressed center plate member and longitudinal members integral therewith projecting above said center plate member and spaced apart to admit the center sills of the car body between them, said bolster having upwardly concaved forged steel transverse members to accommodate the brake rod, substantially as specified.

3. In a steel truck, a cast steel bolster having an integral depressed center plate member and longitudinal members integral therewith projecting above said center plate member and spaced apart to admit the center sills of the car body between them, and transverse bolster members of forged steel upon which the feet of said bolster casting rest, said transverse bolster members each having an upward bend at the middle portion thereof to accommodate the brake rod, substantially as specified.

ETHAN I. DODDS.

Witnesses:
  WILLIAM A. GEIGER,
  H. M. MUNDY.